United States Patent
Stephens

(10) Patent No.: US 11,105,609 B2
(45) Date of Patent: Aug. 31, 2021

(54) MEASUREMENT SYSTEM

(71) Applicant: Mark Stephens, Rockwall, TX (US)

(72) Inventor: Mark Stephens, Rockwall, TX (US)

( * ) Notice: Subject to any disclaimer, the term of this patent is extended or adjusted under 35 U.S.C. 154(b) by 0 days.

(21) Appl. No.: 16/449,635

(22) Filed: Jun. 24, 2019

(65) Prior Publication Data

US 2019/0390953 A1 Dec. 26, 2019

Related U.S. Application Data

(60) Provisional application No. 62/688,571, filed on Jun. 22, 2018.

(51) Int. Cl.
*G01B 11/14* (2006.01)

(52) U.S. Cl.
CPC ................... *G01B 11/14* (2013.01)

(58) Field of Classification Search
CPC ............... G01B 11/00; G01B 11/14
See application file for complete search history.

(56) References Cited

U.S. PATENT DOCUMENTS

| | | | | |
|---|---|---|---|---|
| 4,099,800 A | * | 7/1978 | Bell | B23Q 1/38 33/DIG. 2 |
| 2014/0059981 A1 | * | 3/2014 | Pettersson | B65B 5/024 53/504 |
| 2016/0202056 A1 | * | 7/2016 | Senger | G01C 3/02 356/3 |

OTHER PUBLICATIONS

Besttojumplandingpad.blogspot.com/2012/04/long-jumptriple-jump-laser-measuring.html, Apr. 2012.*
Gill, E73740 Laser Measuring Device Instructions. (Year: 2018).*

* cited by examiner

*Primary Examiner* — Peter B Kim
(74) *Attorney, Agent, or Firm* — Braxton Perrone, PLLC; Bobby W. Braxton; Gregory Perrone

(57) ABSTRACT

A system and method for measuring. The system has at least one rail with a downstream end and an upstream end. There is a deflector at a downstream end which is used in conjunction with a measurement laser which is coupled to a shuttle. The shuttle is moveable relative to the rail. The shuttle also has a sight for zeroing in on the item to be measured.

17 Claims, 4 Drawing Sheets

MEASUREMENT SYSTEM

PRIORITY

The present invention claims priority to Provisional Application No. 62/688,571, filed Jun. 22, 2018 entitled "Measurement System", the entirety of which is hereby incorporated by reference.

BACKGROUND OF THE INVENTION

Technical Field

The present invention relates to a system and method for measuring.

Description of Related Art

In sports, and other times, there is a need for a precise measurement. Using track and field as an example, measurements have to be taken for long jump, javelin, discus, shotput, etc. When a shotput is thrown, the track organizers must measure the distance between the throw line and where the shotput landed. Often this must be accomplished quickly and accurately. Consequently, there is a need for a system and method which allows for fast, efficient, and accurate measurements.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
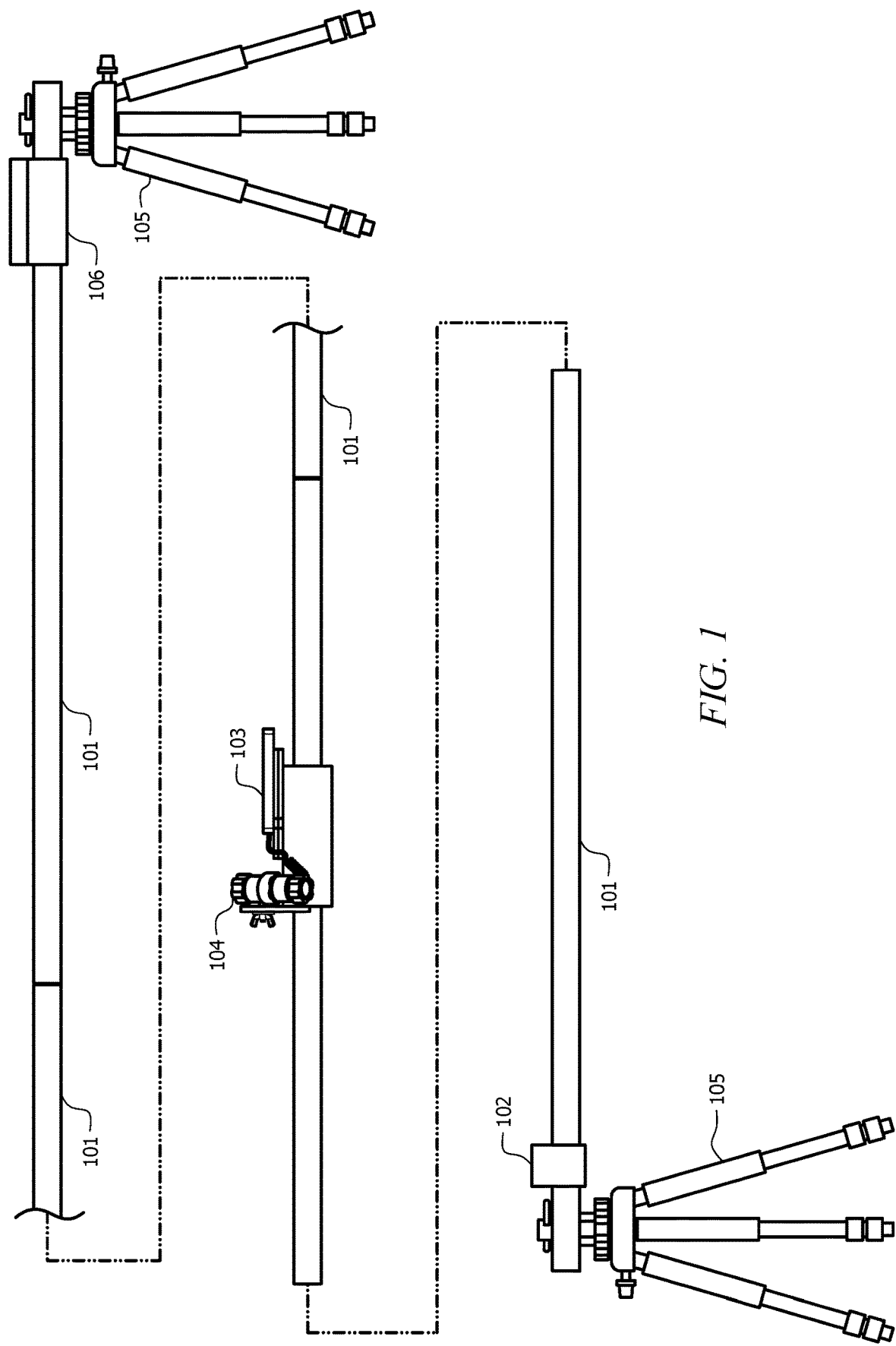
FIG. 1 is a perspective view of a measurement system in one embodiment.

FIG. 1 is a perspective view of a measurement system in one embodiment. As shown the system includes one or more rails 101 which extend along the length of the area to be measured. If the area to be measured is a sandpit, for a broad jump as an example, then the rails 101 can extend the length of the sandpit. Virtually any number of rails 101, with varying lengths, can be utilized. As depicted the system comprises four rails 101 which are 57 and 7/16" in length. As noted, however, the length can be adjusted as desired.

In one embodiment, the rails 101 are modular. This means that a rail 101 can be added or removed to the system as desired to increase or decrease the length of the system, and accordingly, the length of the glide path, as discussed in more detail below.

The rails 101 can comprise virtually any material including metal, plastics, rubber, wood, and combinations thereof. In one embodiment the rails comprise 2" SQ aluminum tube material. Adjacent rails 101 can be coupled via any method or means known in the art including via screws, bolts, and the like. In one embodiment a coupler is used to connect adjacent rails 101. This will be discussed in more detail below.

In one embodiment comprising four sections, the two center sections comprise three 3/8" holes drilled on each end to allow coupler bolts to pass through. The two end sections comprise three 3/8" holes on one end to attach to the coupler and connection hardware to secure the rail to the tripod stands top plate used to support the rail when fully assembled. One of the end sections has a ½" to 3" slot that allows for adjustments. The opposite end section attaches to the top plate with a fixed 3/8"×1" bolt. It should be noted that the stated dimensions are for illustrative purposes only and should not be deemed limiting.

As depicted the rails 101 are elevated relative to the ground. In one embodiment the rails 101 are located at least one foot off the ground. In other embodiments the rails 101 are located three feet or more off the ground. The height of the rails 101 can be determined in part by the length of the supports 105. An elevated rail system allows the sight 104 a better vantage point from which to locate a divet or other indicator which indicates where an object or person landed. In other embodiments the rails 101 are located on the ground.

As depicted the rails 101 are elevated via supports 105. The supports 105 can comprise any physical item which provides the support necessary to elevate the rails. The supports 105 can include items such as bricks, posts, legs, etc. In one embodiment each end is supported by a tri-pod. The number of supports 105 will depend, in part, on the length of the system. A very long system may require more than two supports 105, for example.

In one embodiment, the supports 105 are adjustable. Accordingly, a single support 105 can allow a height of one foot, six inches, or more than two feet, as an example. This increases the versatility of the system.

In one embodiment the rails 101 comprise a built-in level indicator. In this fashion, the operator can ensure that the rails are level, yielding more accurate and consistent results.

As depicted, one end of the rail 101 comprises a deflector 102. In one embodiment the system comprises an upstream end and a downstream end. The downstream end is the end with the deflector. As depicted in FIG. 1, the measurement sensor 103 is to the right of the deflector 102. As such, the measurement sensor 103 is upstream of the deflector 102. Upstream and downstream, as used herein, refer to relative locations on the system with downstream referring to items closer to the deflector 102.

A deflector is used for the sensor to record the measurement. The measurement sensor 103 measures distance between itself and a deflector 102. Thus, as the distance between the measurement sensor 103 and the deflector 102 is increased, the measurement sensor 103 will sense and report an increased distance.

The measurement sensor 103 can comprise any sensor which measures distance. The sensor can comprise lasers, radar, sonar, sound, light, etc. to measure accurate distances.

In one embodiment the measurement sensor 103, for example, can comprise a camera which accurately determines distance by photographing an image. The measurement sensor can include any sensor which measures distance between two points. Specifically, and in one embodiment, the measurement sensor includes a sensor which measures a distance between the measurement laser and a defined point, the deflector 102.

The deflector 102 is a point from which distances are measured. In one embodiment the deflector 102 is fixed and the measurement laser 103 moves relative to the fixed deflector 102. In other embodiments, however, the measurement sensor 103 is fixed, and the deflector 102 moves relative to the fixed measurement sensor 103.

The deflector 102 can comprise any sheet or material which functions with a corresponding measurement sensor 103. The purpose of the deflector 102 is to provide a relative location from which to measure. When the measurement sensor 103 comprises a sensor which emits a laser and then calculates distance based on the laser reflected from a point, the deflector 102 comprises a plate which will reflect the laser. Thus, in one such embodiment the deflector 102 comprises a 1/16" piece of aluminum. If the measurement sensor 103 comprises a photograph, then the deflector 102 will comprise an image from which the distance can be calculated.

The deflector 102 can be coupled to the rail 101 via any method or device known in the art. In one embodiment the deflector 102 is coupled via a 1/4-20×1" Allen Head bolt that will thread into a tapped hole on the top of the rail. A single 5/32 bolt will be used as an alignment dowel.

In one embodiment, the measurement sensor 103 is placed on a shuttle (not depicted in FIG. 1) which slides on the rail. As noted, one embodiment is discussed herein where the deflector 102 is stationary and the measurement sensor 103 is moved along the rail 101. This is for illustrative purposes only as the opposite is also possible, specifically whereby the deflector 102 slides along the rail 101 and the measurement sensor 103 is stationary. The measurement sensor 103 can be placed upon any type of shuttle which allows the measurement sensor 103 to move relative to the deflector 102 on the rail 101.

The shuttle can comprise virtually any material. In one embodiment the shuttle comprises 2½" SQ Aluminum tubing. The tubing walls are 1/8" thick. The shuttle is used to slide over the rails 101 and used as a sleeve to run from one end of the rail to the other. The shuttle can comprise wheels, ball-bearings, or other friction-reducing device to reduce friction between the shuttle and the rail.

In one embodiment, and as depicted, the shuttle will house two laser devices. A gun sight 104 is used to mark the place in the sand where the athlete lands in the sand pit. While one embodiment is discussed wherein the gun sight 104 comprises a laser, this is for illustrative purposes and should not be deemed limiting. The gun sight 104 is used to accurately place the shuttle at the location to be measured. As such the sight 104 can comprise any tool or device which accomplishes this goal. In one embodiment the sight 104 is a lens with a limited range such that the viewer can only see the desired location—such as the landing of a ball or a divot in the sand. A second laser, the measurement sensor 103 discussed above, is used to record the distance of the jump.

The bottom side of the shuttle material, in one embodiment, has a 1" slot cut out. The full length of the shuttle that allows the shuttle to run the length of the rail, allowing the coupler bolts to run through the center section of the rail. The shuttle has to be slid onto the rail prior to attaching the rail to the mounting plate. Either end of the rail can be used to slide the shuttle on. The shuttle has a 1"×1" aluminum "L" material mounted vertically to one end of the shuttle. This is used to mount the gun site laser 104 to the shuttle.

In operation the shuttle is moved slidably along the rail 101 so that the gun sight laser 104 aligns with the place to be measured. Once the shuttle is in the correct location, the measurement sensor 103 measures the distance between the shuttle and the deflector 102. This yields the desired distance. Because, in some embodiments, the sight 104 and the measurement sensor 103 are on the same shuttle, and are on the same rail, subsequent measurements can be made simply and quickly. Further, because, as depicted, the sight 104 and the measurement sensor 103 are coupled to the same shuttle, the angle and relationship between the two is kept consistent for all measurements. This results in increased consistency.

Figure 2:
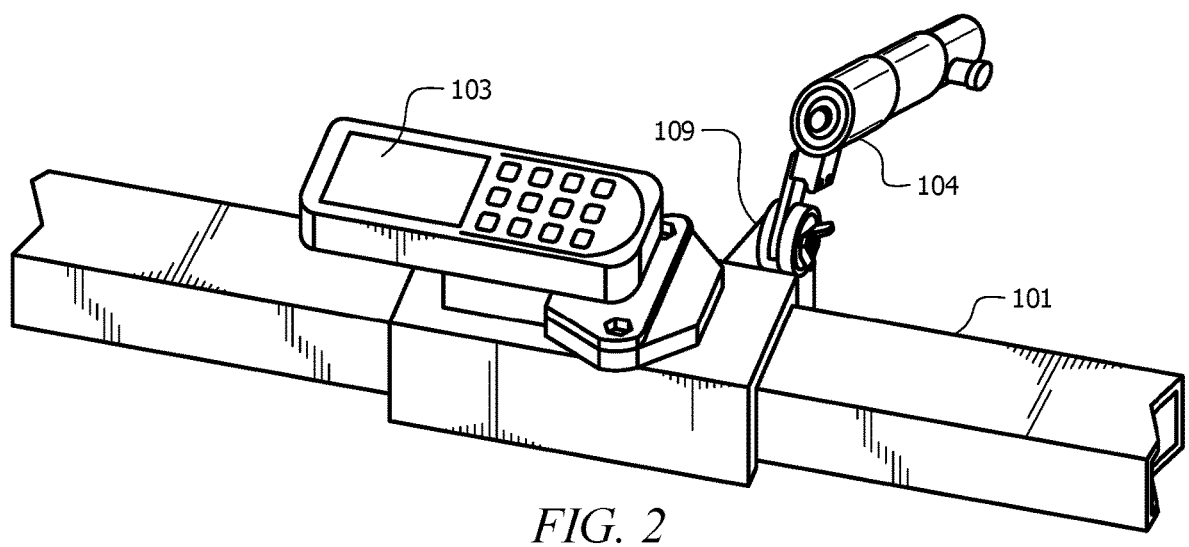
FIG. 2 is a side perspective view of a measurement system in one embodiment.

FIG. 2 is a side perspective view of a measurement system in one embodiment. As can be seen the shuttle 109 has the sight 104 and the measurement sensor 103. In this figure it can be appreciated how the increased height assists the sight 104 with a better vantage point. In this fashion, the spotter can see the divot, and ensure the accuracy of the alignment by utilizing the sight 104.

As can be seen, in one embodiment the sight 104 and the measurement sensor 103 are oriented approximately perpendicular from one another.

As shown, the measurement sensor 103 comprises a display for displaying the measured distance. The measurement sensor 103, as shown, also comprises an input whereby the user can modify units, and input other information.

The measurement sensor 103, in one embodiment, comprises WiFi, Bluetooth, or other technology to allow the measurement sensor 103 to transmit, send, or store the measured data. This further speeds up the process of measuring, recording, and reporting the measured distances in a track event, for example.

Figure 3:
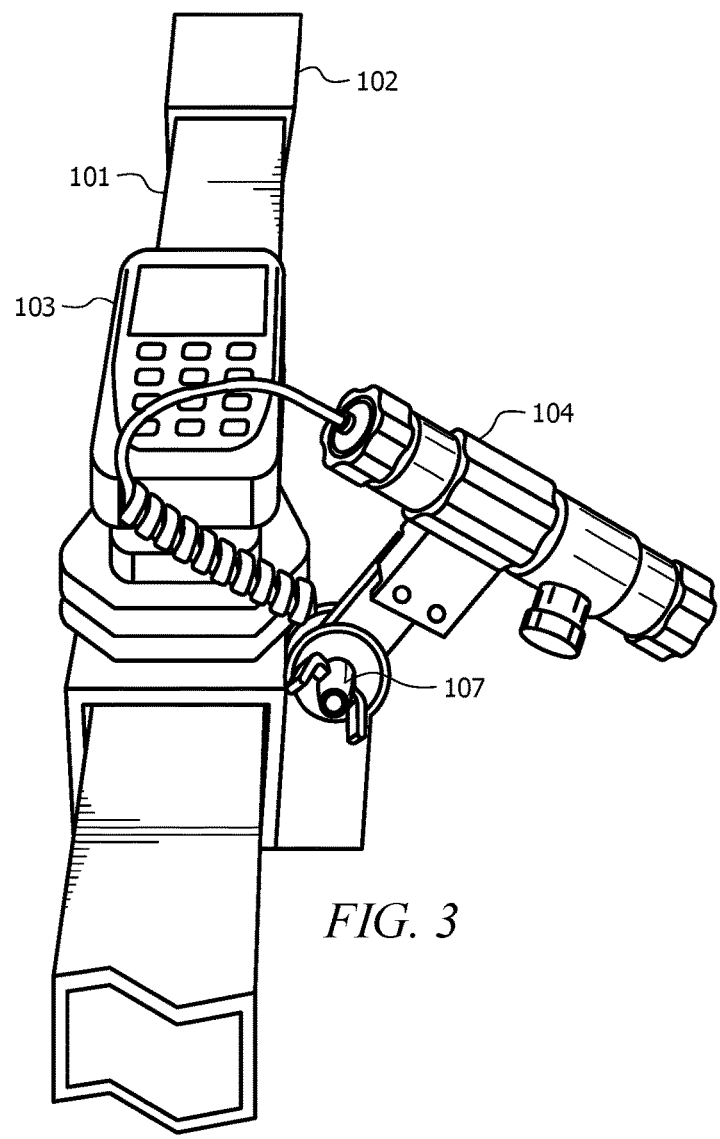
FIG. 3 is a front perspective view of a measurement system in one embodiment.

FIG. 3 is a front perspective view of a measurement system in one embodiment. As depicted, the sight 104 comprises an elevation adjuster 107. This allows the angle of the sight 104 to be adjusted. If, for example, the landing spot in the sand pit were on the far side of the pit, a shallower angle may be necessary to correctly sight the location of the landing.

As can be seen in this figure, in one embodiment the deflector 102 is located at a far end of the rail 101.

Figure 4:
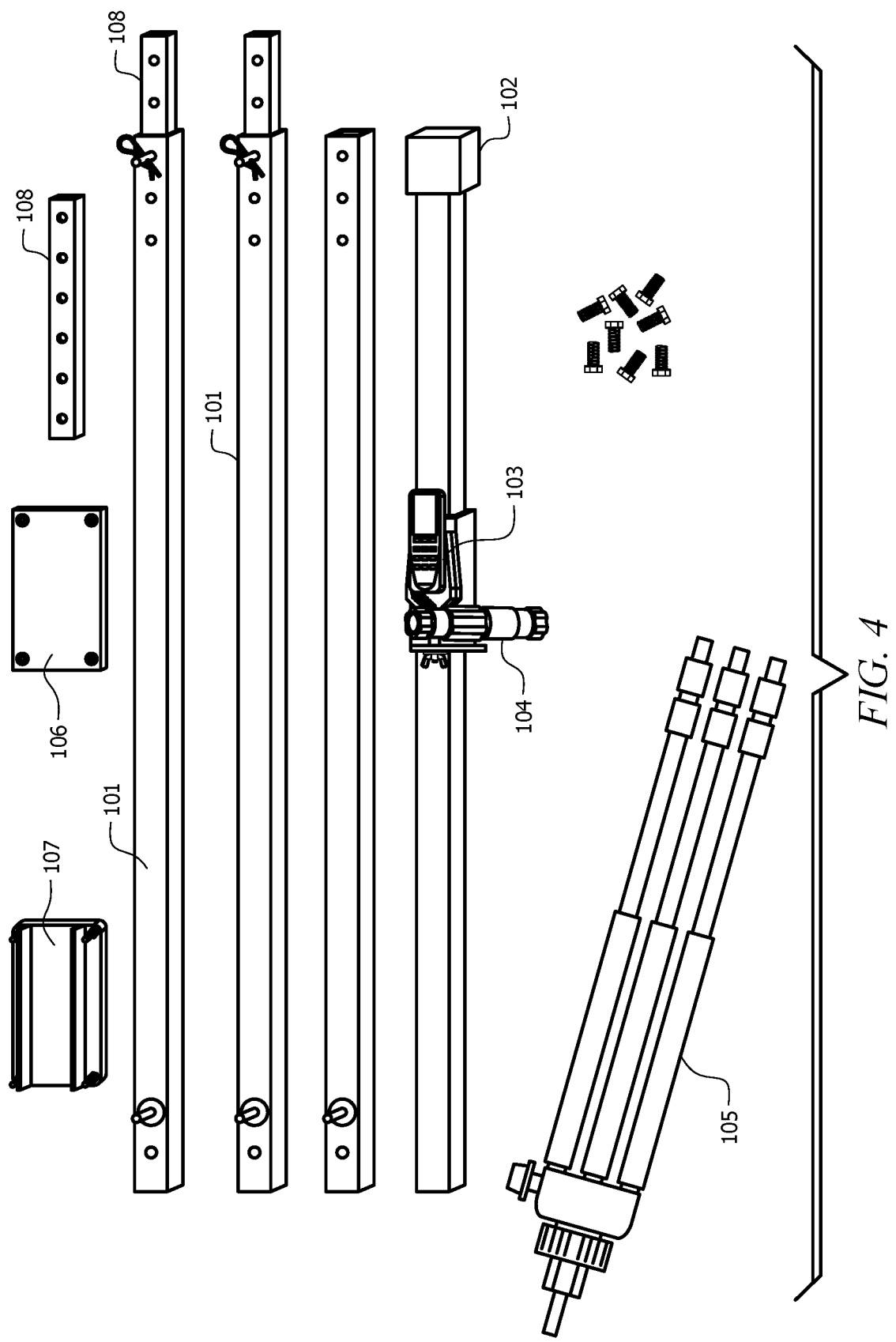
FIG. 4 is a top view of the unassembled parts in one embodiment.

FIG. 4 is a top view of the unassembled parts in one embodiment. As depicted there are four rails. As noted, the size and length of the system can be adjusted by increasing or decreasing the length or number of rails.

As depicted, the rails 101 are coupled via couplers 108. In one embodiment the coupler 108 is a smaller diameter material which fits inside of the rail 101 to join adjacent rails. In one embodiment the couplers comprise three 12" sections of 1¾" SQ Aluminum Tube material. The couplers will have three 3/8-16 tapped holes on each end equally spaced. Three 3/8"-16 Allen Head Cap bolts will be used to connect the rail sections together. One half of each coupler will slide inside the rail sections where the bolts will pass through the holes on the rails and will then screw into the couplers. The passage holes in the rails will align perfectly with the tapped holes in the couplers. A total of 18 bolts will be used to secure the rail sections to the couplers. In this fashion, multiple rails can be quickly adjoined to one another.

Also depicted in FIG. 4 is a top plate 106. The top plate 106 is a component which couples the rail 101 to the support 105. The top plates 106 can comprise any material, but in one embodiment the top plates comprise 3/32" Aluminum flat material and will attach to the top of supports 105, such as tripod stands. In one embodiment, the top plates are 7½"× 5½" and are used to secure the fully assembles rail to the support 105.

In one embodiment the top plate has a 3/8" slotted hole that runs on one end of the plate used for fine adjustment when aligning the rail to the jumping pit. Once the rail is properly aligned to the jumping pit, a single 3/8-16×1" Allen Head cap bolt and nut will be used to secure the rail.

Figure 5:
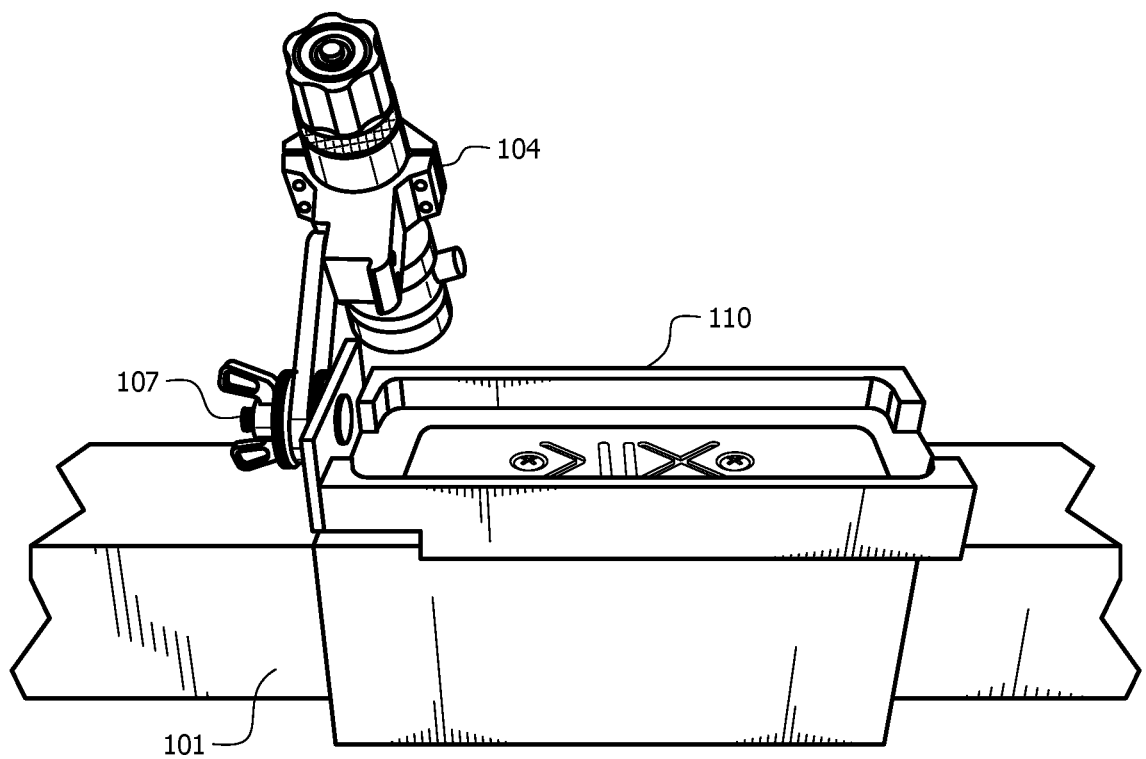
FIG. 5 is a perspective view of a system with a tray in one embodiment.

FIG. 5 is a perspective view of a system with a tray in one embodiment. A tray, as used herein, is a device which houses a measurement sensor 103. As shown, the tray 110 allows the measurement sensor 103 to be placed within the cavity of the tray 110. As shown, the tray 110 has side walls which secure the measurement sensor 103 in the desired location. The trays 110 can comprise virtually any material. In one embodiment the trays are coupled to the shuttle 109.

Figure 6:
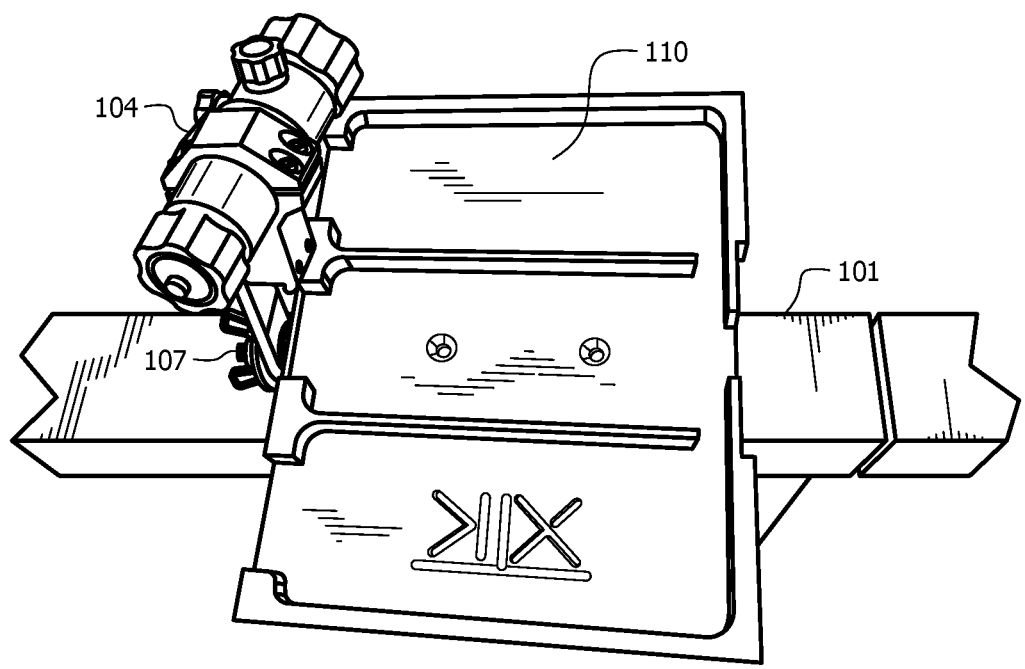
FIG. 6 is a perspective view of a system with a tray for multiple sensors in one embodiment.

FIG. 6 is a perspective view of a system with a tray for multiple sensors in one embodiment. As depicted the tray 110 comprises cavities for three separate measurement sensors 103. These are housed and stored adjacent to one another. Thus in this embodiment three separate measurement sensors 103 are housed in a single tray which is coupled to a single shuttle 109. Having more than one measurement sensor 103 allows multiple measurements to be taken very quickly. As but one example, consider the triple jump. After the athlete has finished, the user will use the sight 104 to position the shuttle 109 at the location of the first landing location. A first measurement sensor 103 will be instructed to determine the distance. That distance is either stored or sent to a computer system for storage. Next, the shuttle 109 is moved to the second landing location. The second measurement sensor 103 will record the second distance. Finally, the shuttle 109 will again be moved and the third measurement sensor 103 will measure the distance of the third and final landing location. Once this is finished, in some embodiments, the three measurement sensors 103 will each display the measured distances. This allows a single user to quickly measure separate distances. The same system can be used for competitors. Take a long jump with three competitors. Each sensor 103 can determine the jump distance for each separate competitor. While three sensors are shown, this is for illustrative purposes only. Virtually any number of adjacent sensors 103 can be utilized.

While a system for measuring a distance has been described, a method for measuring a distance will now be described. As noted, at least one measurement sensor and one sight are mounted on a shuttle which is slideably coupled to at least one rail. A deflector is mounted to a downstream end of the rail. The deflector is aligned to the fixed location, such as the jump boundary. The system can be positioned in such a way that the deflector is located along the jump boundary. Next, the user sees the item to be measured. The user aligns the sight to a point which is removed from the fixed location. As noted, this can be a divot or indention in the sand where a jumper landed, or the location of a ball. The sight is aligned by sliding the shuttle upstream or downstream along the length of the rail.

Thereafter, the distance between the fixed location and the removed point is determined. As noted, in one embodiment this involves casting a laser and calculating the time required to receive a laser back which can be converted to a distance. Those of ordinary skill will understand the various measurement sensors which can be used to calculate the distance between the measurement sensor and the deflector.

Previously, measuring a distance in a sporting event required a measuring tape or stick. An individual would have to bring out the tape and determine the distance. This was very slow. Further, because tape does not always lay flat, the measurements were not always consistent. Laser measurements can consistently and accurately measure distances. However, moving the measurement laser relative to the divot is not always easy. A user would attempt to align the measurement laser next to the divot, as an example, but this is slow and not always accurate. Accordingly, the system and method discussed herein allows the deployment of an easy-to-assemble rail system. The rail system can be placed, a single time, and adequately squared to ensure a precise measurement. Thereafter, the user slides the shuttle to the correct location and takes the measurement. The sand pit can be cleared, and the user is ready for the next measurement. The process is fast and accurate.

Another benefit is that the system is storable. As noted, in one embodiment the system comprises one or more rail components which are coupled together. Thus, the system can be broken down into components and stored. Further, the system can be broken down into components and moved to other locations. Rather than being static, big and bulky, the system is discrete and modular. As noted, in some embodiments the rails can be coupled with screws, bolts, etc.

As noted, the system and method can be used for any situation which requires fast and accurate measurements. The system and method can be utilized in sporting events such as track and field. As such, in some embodiments the system is placed adjacent to a sand pit.

The measurement obtained from the measurement laser 103 can be the final measurement or it can be used to obtain the measurement. As an example, if the deflector 102 is located 10 feet from the launching pad, and the measuring laser 103 states the shuttle 109 is located 7 feet from the deflector 102, then the actual jumped distance is 17 feet. In one embodiment this additional length can be entered into the laser 103 such that the output is the total distance, including the additional length.

While the invention has been particularly shown and described with reference to a preferred embodiment, it will be understood by those skilled in the art that various changes in form and detail may be made therein without departing from the spirit and scope of the invention.

What is claimed is:

1. A system for measuring, said system comprising:
    at least one rail extending from an upstream end to a downstream end;
    a deflector at a downstream end;
    a shuttle moveable relative to said rail;
    a sight coupled to said shuttle; and
    a measurement sensor coupled to said shuttle, wherein said measurement sensor measures a distance between said measurement sensor and said deflector, and wherein said deflector is fixed and the measurement sensor moves relative to said fixed deflector.

2. The system of claim 1 further comprising a support which elevates said rail relative to the ground.

3. The system of claim 2 wherein said support comprises a tri-pod.

4. The system of claim 2 wherein said sight comprises an elevation adjuster.

5. The system of claim 1 comprising more than one rails, and wherein said rails are coupled together via couplers.

6. The system of claim 5 wherein said coupler is attached to a first end of a first rail, and wherein said coupler comprises a reduced diameter which fits in a second end of a second rail.

7. The system of claim 1 wherein said at least one rail further comprises a level.

8. The system of claim 1 wherein said sight and said measurement sensor are oriented approximately perpendicular from one another, and wherein said sight and said measurement sensor are located on the same shuttle.

9. The system of claim 1 wherein said measurement sensor comprises a laser.

10. The system of claim 1 wherein said shuttle comprise a friction reducing device.

11. The system of claim 1 further comprising a tray which is coupled to said shuttle, and wherein said sensor is located on said tray.

12. The system of claim 11 wherein said tray comprises a cavity for housing a sensor.

13. The system of claim 11 wherein said tray houses more than one measuring sensor on a single tray.

14. A method for measuring a distance, said method comprising the steps of:
   mounting at least one measurement sensor and a sight to a shuttle which is slideably coupled to at least one rail extending from an upstream end to a downstream end;
   mounting a deflector at a downstream end;
   aligning said deflector to a fixed location;
   aligning said sight to a point removed from said fixed location;
   determining the distance between said fixed location and said point removed.

15. The method of claim 14 wherein said measurement sensor comprises a laser.

16. The method of claim 14 wherein said aligning comprises moving said shuttle along said rail.

17. The method of claim 14 wherein said mounting at least one measurement sensor comprises mounting at least two measurement sensors on a tray which is coupled to said shuttle.

* * * * *